US011721106B2

(12) United States Patent
Grancharov et al.

(10) Patent No.: US 11,721,106 B2
(45) Date of Patent: Aug. 8, 2023

(54) METHOD FOR ASSOCIATING OBJECTS IN A VIDEO

(71) Applicant: Telefonaktiebolaget LM Ericsson (publ), Stockholm (SE)

(72) Inventors: Volodya Grancharov, Solna (SE); Charles Kinuthia, Stockholm (SE); Sigurdur Sverrisson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/275,172

(22) PCT Filed: Sep. 11, 2018

(86) PCT No.: PCT/EP2018/074453
§ 371 (c)(1),
(2) Date: Mar. 10, 2021

(87) PCT Pub. No.: WO2020/052737
PCT Pub. Date: Mar. 19, 2020

(65) Prior Publication Data
US 2022/0044045 A1    Feb. 10, 2022

(51) Int. Cl.
*G06V 20/52* (2022.01)
*G06V 10/25* (2022.01)
*G06F 18/22* (2023.01)
*G06F 18/2415* (2023.01)
(Continued)

(52) U.S. Cl.
CPC .............. *G06V 20/52* (2022.01); *G06F 18/22* (2023.01); *G06F 18/2415* (2023.01);
(Continued)

(58) Field of Classification Search
None
See application file for complete search history.

(56) References Cited

U.S. PATENT DOCUMENTS

| 9,342,759 B1 | 5/2016 | Chen et al. |
| 9,552,648 B1 * | 1/2017 | Zhang .................. G06V 10/255 |

(Continued)

OTHER PUBLICATIONS

International Search Report and Written Opinion of the International Searching Authority for PCT International Application No. PCT/EP2018/074453 dated Apr. 5, 2019.

(Continued)

*Primary Examiner* — David Perlman
(74) *Attorney, Agent, or Firm* — Sage Patent Group

(57) ABSTRACT

The invention relates to a computer implemented method for associating objects in a video comprising subsequent frames, the method comprising obtaining first object proposal region information of a previous frame, determining second object proposal region information of a current frame, wherein the first and second object proposal region information are at least indicative of an appearance measure, a spatial location and a detection probability of each object proposal region of the respective frame, associating objects in the video by at least associating a first set of object proposal regions of the previous frame to a second set of object proposal regions of the current frame, wherein the object proposal regions are associated using distance measures calculated based on the appearance measures, the spatial locations and the detection probabilities.

9 Claims, 6 Drawing Sheets

(51) Int. Cl.
*G06V 10/70* (2022.01)
*G06V 10/74* (2022.01)
*G06V 10/82* (2022.01)
*G06V 10/62* (2022.01)

(52) U.S. Cl.
CPC .............. *G06V 10/25* (2022.01); *G06V 10/70* (2022.01); *G06V 10/761* (2022.01); *G06V 10/82* (2022.01); *G06V 10/62* (2022.01)

(56) References Cited

U.S. PATENT DOCUMENTS 11,227,160 B2 * 1/2022 Wood .................... G06V 20/41
2018/0268247 A1 * 9/2018 Gubbi Lakshminarasimha .......... G06V 20/56

OTHER PUBLICATIONS

Kang et al., "T-CNN: Tubelets With Convolutional Neural Networks for Object Detection From Videos," IEEE Transactions on Circuits and Systems for Video Technology, vol. 28, Issue 10, pp. 2896-2907 (first published Aug. 2017).

"YOLO: Real Time Object Detection," GitHub YOLO Real Time Object Website, retrieved from the Internet at: https://github.com/pjreddie/darknet/wiki/YOLO:-Real-Time-Object-Detection (Nov. 2019), 13 pages.

"ImageNet," Imagenet Web Page, retrieved from the Internet at: http://www.image-net.org/ (Jan. 2020), 1 page.

Redmon et al., "YOLO9000: Better, Faster, Stronger," 2017 IEEE Conference on Computer Vision and Pattern Recognition (CVPR), (2017) pp. 6517-6525.

Ren et al., "Faster R-CNN: Towards Real-Time Object Detection with Region Proposal Networks," IEEE Transactions on Pattern Analysis and Machine Intfi Licence, vol. 39, No. 6, (Jun. 2017), pp. 1137-1149.

Liu et al., "SSD: Single Shot MultiBox Detector," Computer Vision—ECCV 2016. Lecture Notes in Computer Science, vol. 9905. Springer, Cham. https://doi.org/10.1007/978-3-319-46448-0_2, 17 pages.

Office Action dated Apr. 4, 2023 for European Patent Application No. 18773953.7, 4 pages.

Bredereck, Michael et al.; "Data Association for Multi-Object Tracking-By-Detection in Multi-Camera Networks" 2012 Sixth International Conference on Distributed Smart Cameras (ICDSC), IEEE; Oct. 30, 3012; pp. 1-6.

* cited by examiner $$D_{n-1,n} = \begin{bmatrix} d_{111\_151} & d_{121\_151} & d_{131\_151} & d_{141\_151} \\ d_{111\_161} & d_{121\_161} & d_{131\_161} & d_{141\_161} \\ d_{111\_171} & d_{121\_171} & d_{131\_171} & d_{141\_171} \\ d_{111\_181} & d_{121\_181} & d_{131\_181} & d_{141\_181} \end{bmatrix}$$

Fig. 5A $$D_{n-1,n} = \begin{bmatrix} d_{111\_151} & \cancel{d_{121\_151}} & d_{131\_151} & d_{141\_151} \\ \cancel{d_{111\_161}} & \boxed{d_{121\_161}} & \cancel{d_{131\_161}} & \cancel{d_{141\_161}} \\ d_{111\_171} & \cancel{d_{121\_171}} & d_{131\_171} & d_{141\_171} \\ d_{111\_181} & \cancel{d_{121\_181}} & d_{131\_181} & d_{141\_181} \end{bmatrix}$$

Fig. 5B

METHOD FOR ASSOCIATING OBJECTS IN A VIDEO

CROSS REFERENCE TO RELATED APPLICATION

This application is a 35 U.S.C. § 371 national stage application of PCT International Application No. PCT/EP2018/074453 filed on Sep. 11, 2018, the disclosure and content of which is incorporated by reference herein in its entirety.

TECHNICAL FIELD

The present invention relates to a method for associating objects in a video. The invention further relates to a computer performing the method.

BACKGROUND

Visual object detectors, e.g. in the form of a computer or video processor, may be used to automatically identify and localize objects that may appear in frames of a video. The object detector typically provides a position of the object, a size of the object and the type of the object, or any combination of these. The type of the object may be recognized as an object class, for example a vehicle, person, animal or building. Automatically identifying and localizing objects in frames is an essential step in many Augmented Reality (AR) and security applications. Some state-of-the-art object detectors are based on Convolutional Neural Networks (CNN).

An example can be found in S. Ren, K. He, R. Girshick, and J. Sun, "*Faster R-CNN: Towards real-time object detection with region proposal networks*," IEEE Trans. Pattern Analysis and Machine Intelligence, 2017. A further example may be found in W. Liu, D. Anguelov, D. Erhan, C. Szegedy, S. Reed, C. Fu, and A. Berg, "*SSD: Single shot multibox detector*" in Proc. European Conference Computer Vision, 2016. Yet an example may be found in J. Redmon and A. Farhadi, "*YOLO9000: Better, faster, stronger*" in Proc. IEEE Conf. Computer Vision and Pattern Recognition, 2017.

A drawback of such conventional systems is that they may suffer from object identity or tracklet identity switching. This may typically occur when two or more objects are close together, e.g. two football players competing for a ball. This is due to the fact that such systems typically applies a visual object detector individually on each frame of consecutive or subsequent frames in the video, thereby ignoring temporal relations between objects in subsequent frames or the fact that the visual scene evolves slowly from one frame to the other.

A straightforward attempt to improve the accuracy of conventional object detectors, using the information shared between frames, is to smooth detection probabilities and proposed regions coordinates before applying the decision threshold in a current frame. A drawback of the above mentioned method of smoothing detection probabilities is that it has low accuracy and may not accurate enough. The objects could still be easily lost, e.g. if the detection probability of objects drops below a hard detection probability threshold for a few frames, despite of the fact that visual object appearance across frames is visually virtually unchanged.

Thus, there is a need for an improved method and computer.

OBJECTS OF THE INVENTION

An objective of embodiments of the present invention is to provide a solution which mitigates or solves the drawbacks described above.

SUMMARY OF THE INVENTION

The above objective is achieved by the subject matter described herein. Further advantageous implementation forms of the invention are described herein.

According to a first aspect of the invention, the above mentioned objectives are achieved by a computer implemented method for associating objects in a video comprising subsequent frames, the method comprising obtaining first object proposal region information of a previous frame, determining second object proposal region information of a current frame, wherein the first and second object proposal region information are at least indicative of an appearance measure, a spatial location and a detection probability of each object proposal region of the respective frame, associating objects in the video by at least associating a first set of object proposal regions of the previous frame to a second set of object proposal regions of the current frame, wherein the object proposal regions are associated using distance measures calculated based on the appearance measures, the spatial locations and the detection probabilities.

At least one advantage of this aspect of the disclosure is that object detection accuracy is improved by associating objects in subsequent frames using distance measures calculated based on the appearance measures, the spatial locations and the detection probabilities.

According to a second aspect of the invention, the above mentioned objectives are achieved by a computer configured to perform the method according to the first aspect.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 5A illustrates distance measures according to one or more embodiments.

FIG. 5B illustrates mapping of object proposal regions according to one or more embodiments.

Figure 1:
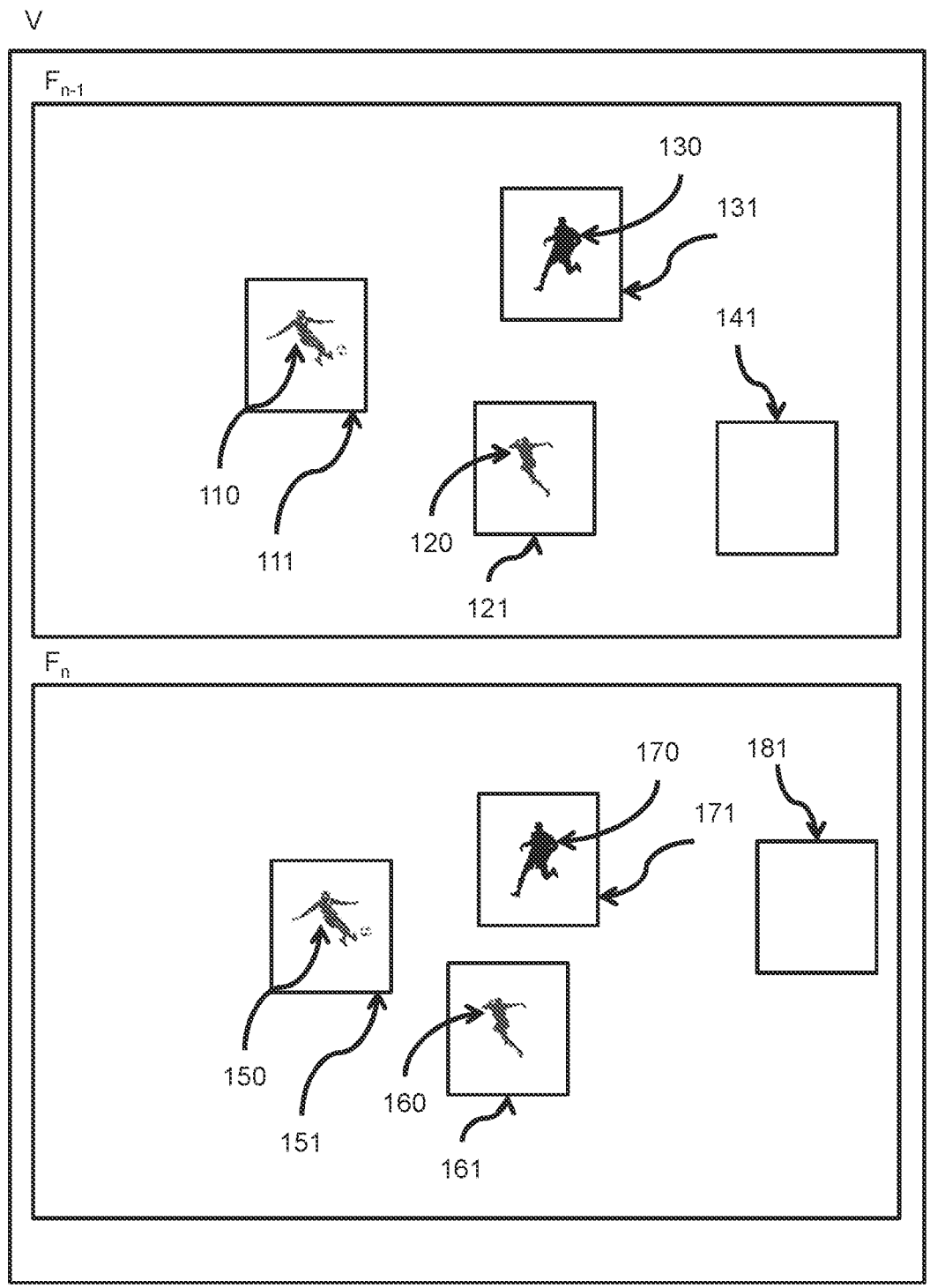
FIG. 1 illustrates a scenario for associating objects in a video according to one or more embodiments.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In this disclosure the term "object proposal region" denotes a region indicating an area within which it is proposed that an object is present. The region may have any suitable form such as a rectangle, oval, circle or an arbitrary shaped polygon with an associated center coordinate, e.g. located at or near the center of gravity.

In one example, object proposal regions are received from a neural network algorithm, each comprising a possible object or a candidate object. The size of candidate objects may be defined by the object proposal regions, e.g. in the form of a bounding box. The bounding box/object proposal region may surround the candidate object. Horizontal and vertical dimensions of the object proposal regions may be the width and height of the bounding box. Alternatively or in addition, the size of selected objects (e.g. each selected object proposal region comprising an object) may be defined by a bounding box that surrounds the selected object and the object proposal region coordinates may be the width and height of the bounding box. The coordinates may alternatively or in addition be the co-ordinates of the center of the bounding box.

In this disclosure the term "detection probability" denotes a likelihood or probability that a detected proposal region comprises an object.

In this disclosure the term "frame" denotes frames, frames, images or video frames in a video. In other words the individual subsequent images, which when shown one after the other make out the video.

The method presented herein provides solution to the listed above drawbacks of conventional solutions. This can be achieved by performing advanced data association to connect objects in frame n−1 to frame n based on position, size, detection probability, and similarity measure based on the object appearance.

Even if the objects are close together and of the same size, the difference in appearance helps to discriminate the objects, perform correct data association and keep the tracklet ID. The appearance may be captured by computing the color histograms of the object proposals in consecutive frames, and it is also used to increase the detection probability of proposal regions when objects they have similar appearance across frames.

The advantage of the proposed solution is at least to increase object detector accuracy as well as stability of tracklet IDs. The proposed algorithm may run in real-time as a post-processor to the visual object detector, which allows technology re-use with all types of modern detectors.

In one example, object proposal regions are identified or detected using a neural network that depends on region proposal algorithms to hypothesize object locations within a frame. For example, under the assumption that all objects of interest share common visual properties that distinguish them from the background, a method is designed or trained that outputs a set of proposal regions within the frame that are likely to contain objects. These methods tend to calculate a large number of candidate objects/object proposal regions for each frame, for example 4800 candidate objects. The candidate objects may be represented as a matrix. Each row of the matrix may represent one candidate object, with columns specifying the position and size of the candidate object. The position and size may be defined relative to a bounding box or object proposal region that encloses the candidate object. The columns may define the height and width of the bounding box, and the position may be an anchor point for constructing the bounding box such as a center point or a corner of the bounding box. A column is also included to provide an object detection probability or confidence score for each candidate object identified, namely a calculated detection probability of a correct identification of the content of the object proposal region as an object. The set of candidate objects/object proposal region contained in the matrix may then simply thresholded to provide a list of detected objects. Specifically, the detection probability provided for each candidate object/object proposal region is compared to a threshold T and candidate objects detected as objects and/or added to the object list if their detection probability exceeds the threshold value T. The list of detected objects may then be output. An overlay may be provided when the frame is displayed, for example to indicate all or some of the objects from the output list, such as by showing the outline of bounding boxes or by displaying markers, object identities or tracklet identities below, above or alongside the detected objects.

In this disclosure the term "appearance measure" denotes a measure of visual appearance. Two different proposal regions comprising visual representations/image pixels having similar or identical appearance measure would be considered as similar, i.e. similar appearance measures indicate visual similarity. One example of an appearance measure is a color histogram calculated using color values of frame pixels comprised within the proposal region, e.g. a histogram calculated on RGB values of the pixels comprised in the proposal region.

In this disclosure the term "spatial location" denotes a location of or relating to a captured frame, e.g. a row and column of a pixel comprised in an frame.

FIG. 1 illustrates a scenario for associating objects in a video according to one or more embodiments. FIG. 1 illustrates a video V comprising a previous frame $F_{n-1}$ and a current and subsequent frame $F_n$. It is understood that the video V may comprise a previous frame The video or video segment is received, e.g. by a computer or video processor. The video may be received in different ways. For example, the video may be provided as a video feed, for example a streamed video feed. The video feed may be obtained from a live recording, and may optionally be obtained in real time. Alternatively or additionally, the video segment may be received by retrieving a video segment that was previously recorded and stored. For example, the video segment may be recorded on a storage medium such as a DVD or blu-ray disk, or a computer memory device such as a hard drive, flash drive, memory stick or memory card. The video may be a complete video, for example a film or episode of a program. Alternatively, the video may be an excerpt from a longer video. The video segment may be received as part of the longer video, and the computer may be used to split the longer video and create a shorter video. For example, footage from a sports event may be received by the computer, which then creates a shorter video corresponding to highlights of the sporting event. The video segment may even be just a passage of play in a sporting event. By way of example only the video is described as a passage of play in a soccer match herein, for example a passage of play immediately preceding and including a goal being scored in a soccer match.

First object proposal region information of the previous frame $F_{n-1}$ is obtained, e.g. by retrieving the information from memory. The first object proposal region information may typically comprise first set of object proposal regions 111, 121, 131, 141. The first object proposal region information may further comprise detection probabilities for each of the object proposal regions 111, 121, 131, 141. The first object proposal region information may further comprise an appearance measure for each of the object proposal regions 111, 121, 131, 141. The first object proposal region information may further comprise a spatial location of each object proposal region, e.g. center coordinate of the object proposal region. Optionally, only a subset of a number N, e.g. 25 object proposal regions having the highest detection probabilities, are obtained. In other words, object proposal region related to objects with the highest detection probabilities are selected, e.g. 25 object proposal regions having the highest detection probabilities.

As can be seen from the figure, only three of the object proposal regions 111, 121, 131 comprise actual objects 110, 120 and 130. Object proposal region 141 can be seen as a "false detection".

Second object proposal region information of the current frame $F_n$ is then determined. The second object proposal region information may typically comprise a second set of object proposal regions 151, 161, 171, 181 and corresponding spatial locations and detection probabilities for each of the object proposal regions 151, 161, 171, 181. The spatial locations may e.g. comprise center coordinates of the object proposal regions. The object proposal regions 151, 161, 171, 181 are typically identified or detected using a neural network that depends on region proposal algorithms to hypothesize object locations within the current frame $F_n$. An example of such an algorithm is described further in "YOLO9000: Better, faster, stronger" in Proc. IEEE Conf. Computer Vision and Pattern Recognition, 2017. An appearance measure for each of the object proposal regions 151, 161, 171, 181 of the current frame $F_n$ is then determined and added to the second object proposal region information. One example of an appearance measure is a color histogram calculated using color values of frame pixels comprised within the proposal region, e.g. a histogram calculated on RGB values of the pixels comprised in the proposal region. Optionally, only a subset of a number N, e.g. 25 object proposal regions having the highest detection probability, is determined.

As can be seen from the figure, only three of the object proposal regions 151, 161, 171 comprise actual objects 150, 160 and 170. Object proposal region 181 can be seen as a "false detection".

Objects in the video V are associated by at least associating the first set of object proposal regions 111, 121, 131, 141 of the previous frame $F_{n-1}$ to the second set of object proposal regions 151, 161, 171, 181 of the current frame $F_n$. The object proposal regions may be associated using distance measures calculated based on the appearance measures, the spatial locations and the detection probabilities.

Associating objects in the video may further be performed by mapping a first set of object proposal regions of the previous frame $F_{n-1}$ to a second set of object proposal regions of the current frame $F_n$ based on minimum distances of the distance measures $D_{n,n-1}$.

The detection probability of each associated object proposal region of the current frame $F_n$ may further be adapted. This typically comprises increasing or offsetting the detection probability of each associated object proposal region to reduce the risk of losing or dropping the object between frames, e.g. in a scenario when there is a temporary drop in detection probability of an object in the current frame $F_n$ in relation to the detection probability of the previous frame $F_{n-1}$.

Associating objects in the video may further comprise detecting objects of the current frame $F_n$ by determining associated and/or mapped object proposal regions of the current frame $F_n$ having a detection probability above the threshold T.

In one example, the object 110 in the previous frame $F_{n-1}$ is associated to the object 150 in the current frame $F_n$, as a combined distance measure $D_{n,n-1}$ indicates that the appearance measures, the spatial locations and the detection probabilities are most similar for the object proposal region 111 related to object 110 and the object proposal region 151 related to object 150. It may then be determined that the object 110 and the object 150 represent the same object in the previous frame $F_{n-1}$ as well as in the current frame $F_n$. Further this may involve assigning identical tracklet identities to the object 110 and the object 150, e.g. to assign the same name of a football player to the object 110 in the previous frame $F_{n-1}$ and the object 150 in the current frame $F_n$. It may further be determined that object proposal region 121 related to object 120 is associated to the object proposal region 161 related to object 160. It may further be determined that object proposal region 131 related to object 130 is associated to the object proposal region 171 related to object 170. It may further be determined that object proposal region 141 is not associated to the object proposal region 181. In other words the combined distance measure $D_{n,n-1}$ indicates that object proposal region 141 and object proposal region 181 comprises or represent different objects.

Figure 2:
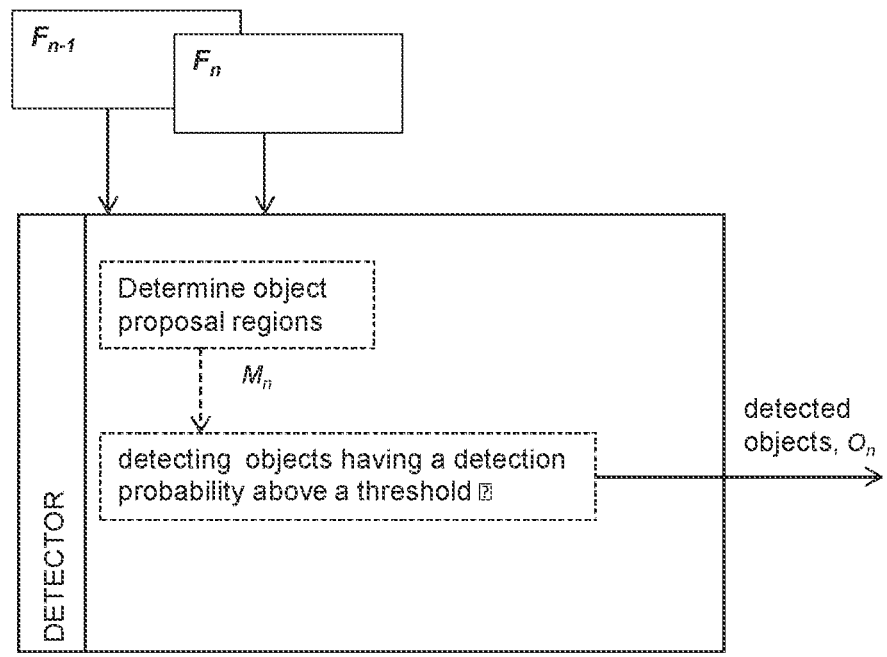
FIG. 2 illustrates an example of a conventional method for detecting objects.

FIG. 2 illustrates an example of a conventional method for detecting objects. In this example, a video comprising frames $F_{n-1}$, $F_n$ is received. Each frame is then individually detected, i.e. operating on a frame-by frame basis, and analyzed to detect objects $O_n$. A plurality of object proposal regions are determined or detected together with corresponding spatial location and object detection probability.

The objects $O_n$ are detected by simply comparing each detection probability to a "hard" threshold T. In other words, all object proposal regions having an object detection probability above the threshold T is detected as an object.

This method has the drawback that objects may be lost between frames, e.g. detected in the frame $F_{n-1}$ but not in frame $F_n$. A further drawback is that object or tracklet identities may be swapped when objects are close and/or crossing paths.

Figure 3:
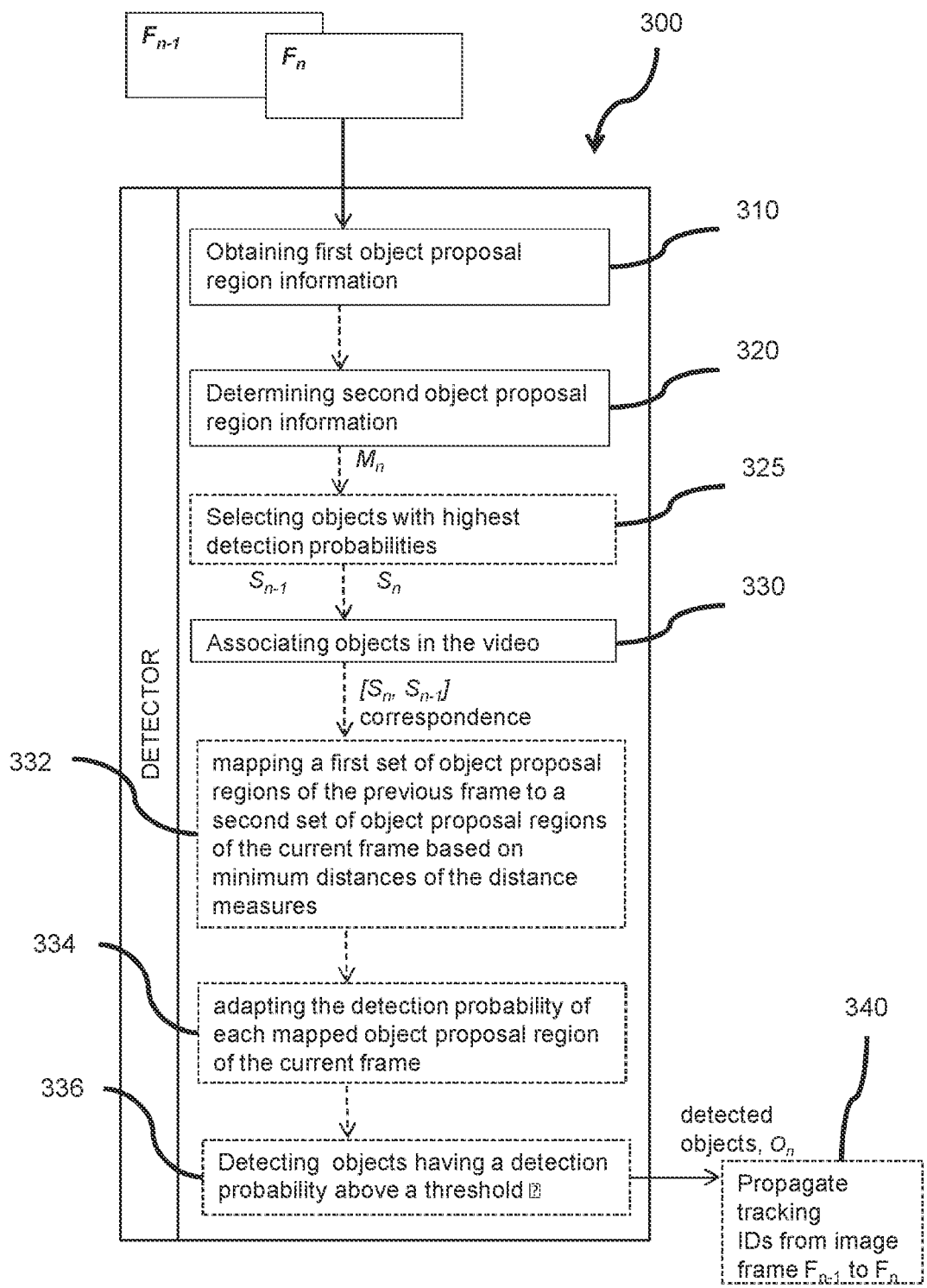
FIG. 3 shows method for associating objects in a video according to one or more embodiments.

FIG. 3 shows method 300 performed by a computer 600 for associating proposal regions representing objects in a video according to one or more embodiments. A computer implemented method 300 for associating objects in a video V comprising subsequent frames $F_{n-1}, F_n$ is provided. The method comprises:

Step 310: obtaining first object proposal region information of a previous frame $F_{n-1}$. The first object proposal region information is at least indicative of an appearance measure, a spatial location and a detection probability of each object proposal region of the previous frame $F_{n-1}$. The first object proposal region information may e.g. be obtained by reading from memory 615 of the computer.

In embodiments, the method comprises an initialization phase when receiving the first frame, comprising performing step 320 and step 336 on the first frame of the video to obtain the first object proposal region information of the first previous frame $F_{n-1}$.

Step 320: determining second object proposal region information of a current frame $F_n$. The second object proposal region information is at least indicative of a corresponding appearance measure, a spatial location and a detection probability of each object proposal region of the current frame $F_n$.

Determining second object proposal region information is further described in relation to FIG. 1.

In one example, the corresponding appearance measure is determined as a histogram calculated on RGB values of the pixels comprised in the proposal region. The spatial location is determined as a center coordinate of the object proposal region. The detection probability is obtained from the neural network algorithm.

In the present disclosure color histograms are used to calculate/determine an appearance measure and thus model the visual object appearance and calculate similarity between objects across frames. Alternatively feature descriptors such as Histograms of Oriented Gradients (HOG) could be used to calculate/determine an appearance measure.

The object's appearance measure may be calculated/determined using RGB color spaces. Alternatively, color spaces like Lab and HSV can be used to reduce the influence of image intensity affecting the histogram.

Figure 4:
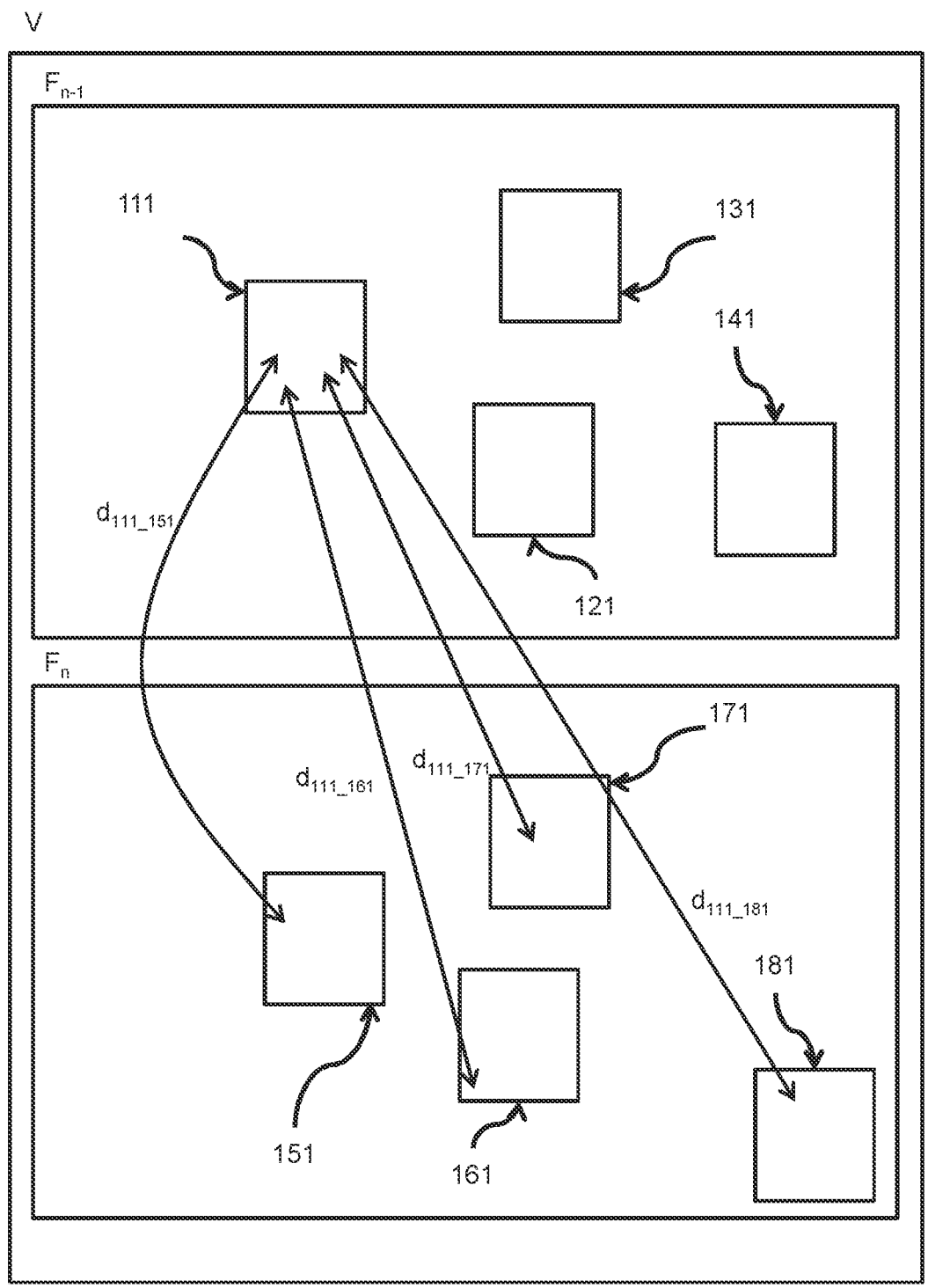
FIG. 4 illustrates calculation of distance measures according to one or more embodiments.

Appearance distance $d(c_n, c_{n-1})$ used herein may be calculated using normalized root mean squared error as further described in relation to FIG. 4, but alternatively it could be calculated/determined using histogram intersection, Bhattacharyya distance or Chi-Square.

Optional step 325: selecting objects with highest detection probabilities. In some cases, thousands of object proposal regions are determined/detected and computational complexity may be reduced by only considering a number $S_{n-1}$ of object proposal regions from the previous frame $F_{n-1}$ and a number $S_n$ of object proposal regions from the current frame $F_n$ having the highest detection probabilities.

The maximum number of objects in a frame is application dependent. In the case of a detector for sports videos, e.g., football, it could be set to $L_M=25$.

In one example, a large number of candidate objects/object proposal regions for the current frame $F_n$ is provided, for example 4800 candidate objects. The 4800 candidate objects are then sorted after object detection probability, with the highest object detection probability first. 25 candidate objects/object proposal regions having the highest object detection probability are then selected for further processing in the method, and the remaining candidate objects/object proposal regions are disregarded.

Step 330: associating objects in the video V by at least associating a first set of object proposal regions 111, 121, 131, 141 of the previous frame $F_{n-1}$ to a second set of object proposal regions 151, 161, 171, 181 of the current frame $F_n$. In one embodiment, the object proposal regions are associated using distance measures $D_{n,n-1}$ calculated based on the appearance measures, the spatial locations and the detection probabilities.

In one example, objects having a minimum distance measure are considered to be the same. A more detailed example of associating objects in the video V is provided in relation to FIG. 1.

In embodiments, associating objects in the video V is performed by mapping object proposal regions, adapting the detection probability of each mapped object proposal region and then detecting objects having a detection probability above a threshold.

This has the advantage to improve object detection accuracy by reducing the likelihood to loose or drop objects between subsequent frames.

In one embodiment, the step of associating objects further comprises further steps:

Optional step 332: mapping a first set of object proposal regions of the previous frame $F_{n-1}$ to a second set of object proposal regions of the current frame $F_n$ based on minimum distances of the distance measures $D_{n,n-1}$.

This may be performed as further described in relation to FIG. 5B.

Optional step 334: adapting the detection probability of each mapped object proposal region of the current frame $F_n$.

In one embodiment, associating objects in the video is further performed by adapting the detection probability of each mapped object proposal region of the current frame $F_n$ if the corresponding appearance distance measure is below a second threshold $\varphi$.

In one embodiment, adapting the detection probability further comprises determining coefficients as:

$$\text{if } d(\dot{c}_n, \dot{c}_{n-1}) < \varphi \\ \psi = \psi_{min}, \alpha = \alpha_{max} \\ \text{else} \\ \psi = \psi_{max}, \alpha = \alpha_{min}$$

where $\dot{c}_n$ and $\dot{c}_{n-1}$ are appearance measures of two mapped object proposal regions (one from frame $F_n$ and one from frame $F_{n-1}$). $\alpha_{max}$ and $\alpha_{min}$ are forgetting factors, $\psi_{max}$ and $\psi_{min}$ are low probability thresholds, which qualify proposal region for detection probability adaptation.

In one embodiment, adapting the detection probability further comprises increasing the detection probability of a given object proposal region, e.g. to prevent losing an existing object due to fluctuations of detection probabilities in the current frame. In one embodiment, the detection probability is increased if $((\dot{p}_{n-1} > \dot{p}_n) \& \dot{p}_n \geq \psi)$ by determining the updated detection probability as:

$$\dot{p}_n = \alpha \cdot \dot{p}_{n-1} + (1-\alpha) \cdot \dot{p}_n$$

where $\dot{p}_n$ and $\dot{p}_{n-1}$ are detection probabilities of two mapped object proposal regions (one from frame n and one from frame n−1).

In embodiments, the second threshold $\varphi$ could be set to $\varphi=0.1$ In embodiments, wherein $\psi_{min}=0.2$ and $\psi_{max}=0.4$.

In embodiments, the forgetting factors could be set to $\alpha_{max}=0.999$ and $\alpha_{min}=0.98$.

Optional step 336: detecting objects of the current frame (Fe) by determining mapped object proposal regions of the current frame (Fe) having a detection probability above a threshold T.

In embodiments, the detection threshold could be set to θ=0.5.

In some embodiments, objects are tracked in the sense that an identity follows an object, at least as long as the object is within frames of the video v.

In a further embodiment, the method further comprises the step:

Optional step 340: propagating tracking identities from objects 110, 120, 130 detected in the previous frame $F_{n-1}$ to objects 150, 160, 170 detected in the current frame $F_n$.

In one embodiment, the distance measures $D_{n,n-1}$ between object proposal regions of the previous frame $F_{n-1}$ and the object proposal regions of the current frame $F_n$ are calculated as: $D_{n,n-1}=d(X_n,X_{n-1})+d(c_n,c_{n-1})$, wherein $d(X_n,X_{n-1})$ is a combined spatial-probability distance measure and $d(c_n,c_{n-1})$ is an appearance distance measure.

In one embodiment, the distance measures ($D_{n,n-1}$) are calculated as a weighted sum of the combined spatial-probability distance measure and the appearance distance measure. Calculating distance measures are further described in relation to FIG. 4.

To provide the reader with a better understanding of a possible application of the present disclosure, a use case embodiment of the present disclosure is presented below:

Initialization (first frame in the video sequence):

1) In the initial frame, pick $L_M$ of the proposal regions with the highest probability.

2) Accept region proposals with detection threshold θ as detected objects

3) Compute the RGB color histograms $c_0$ for those objects

4) Assign tracking IDs to all detected objects.

For all consecutive frames repeat:

5) In the current frame (with index n) pick $L_M$ of the proposal regions with the highest probability.

6) Compute the RGB color histograms $c_n$ for the selected proposals in the current frame.

7) Compute distance measure between all selected region proposal in the current frame n and previous frame $F_{n-1}$ (in total $L_M*L_M$ distances $D_{n,n-1}$), where the distance measure is calculated as: $D_{n,n-1}=d(X_n,X_{n-1})+d(c_n,c_{n-1})$ where $d(c_n,c_{n-1})$ is the distances between the color histograms of the selected region proposal regions in past and current frame (it is a matrix of size $L_M*L_M$) similarly, $d(X_n,X_{n-1})$ is a matrix capturing distances between the spatial coordinates and detection probability of the selected proposal regions.

8) The data association is done using a greedy algorithm (eliminating one by one pairs of proposal regions with lowest distance) to find a mapping that minimizes the distances between proposals in frame $F_n$ and frame $F_{n-1}$ 9) If the mapped proposals have a histogram distance below a certain threshold, φ, the coefficients (used in the next algorithmic step) for update of detection probability before thresholding are modified according as follows:

if $d(\acute{c}_n, \acute{c}_{n-1}) < \varphi$
 $\psi = \psi_{min}$, $\alpha = \alpha_{max}$
else
 $\psi = \psi_{max}$, $\alpha = \alpha_{min}$ where $\acute{c}_n$ and $\acute{c}_{n-1}$ are color histograms of two connected by the data association algorithm proposal regions (one from frame $F_n$ and frame $F_{n-1}$.

10) The detection probability of a give proposal region is increased to prevent losing an existing object due to fluctuations of detection probabilities in the current frame if $((\acute{p}_{n-1}>\acute{p}_n)$ & $\acute{p}_n \geq \psi)$ $\acute{p}_n = \alpha \cdot \acute{p}_{n-1}+(1-\alpha)\cdot \acute{p}_n$ where $\acute{p}_n$ and $\acute{p}_{n-1}$ are detection probabilities of two connected by the data association algorithm proposal regions (one from frame $F_n$ and one from frame $F_{n-1}$)

11) The next step is to accept proposals above a hard threshold θ as detected objects, then for the mapped proposals propagate the IDs from the previous frame. For the unmatched proposals new IDs are assigned.

12) Store in a buffer calculated region proposals, histograms, and IDs from frame $F_n$, to be used in the next frame $F_{n+1}$.

The term X used in above could consists of bounding box coordinates of the proposed regions, e.g., center (x,y), width (w) and height (h) of the bounding box, as well as detection probability p for this region. In such case for each proposal region a 5-dimensional vector could be formed:

$X=\{x,y,w,h,p\}$

The total distance between the proposal regions from consecutive frames (algorithmic step 7) cold have different weights $D_{n,n-1}=\eta_1*d(X_n,X_{n-1})+\eta_2*d(c_n,c_{n-1})$ Where $\eta_2$ is preferably larger than $\eta_1$ FIG. 4 illustrates calculation of distance measures $D_{n,n-1}$ according to one or more embodiments. FIG. 4 illustrates the video V comprising a previous frame $F_{n-1}$ and a current and subsequent frame $F_n$. As mentioned in relation to FIG. 1, first object proposal region information of the previous frame $F_{n-1}$ is obtained and typically comprises a first set of object proposal regions 111, 121, 131, 141. The first object proposal region information may further comprise corresponding detection probabilities, appearance measures and spatial locations of the first set of object proposal regions 111, 121, 131, 141. Second object proposal region information of the current frame $F_n$ is then determined. The second object proposal region information typically comprises a second set of object proposal regions 151, 161, 171, 181 and corresponding spatial locations, detection probabilities and appearance measures for each of the object proposal regions 151, 161, 171, 181.

The distance measures $D_{n,n-1}$ between each proposal region of the first set of object proposal regions 111, 121, 131, 141 and each proposal region of the second set of object proposal regions 151, 161, 171, 181 are then calculated. This is illustrated by the arrows in FIG. 4. In the interest of clarity of the figure, only distances between one proposal region 111 and the set of object proposal regions 151, 161, 171, 181 are shown as $d_{111\_151}$, $d_{111\_161}$, $d_{111\_171}$ and $d_{111\_181}$.

The distance measures may in one example be calculated as a sum of a selection of any of Euclidean distances or Euclidean metrics between detection probabilities, appearance measures and spatial locations of the previous frame $F_{n-1}$ and the current frame $F_n$.

In one example the distance measure $d_{111\_151}$, is calculated as $d_{111\_151}=$ spatial distance + detection probability distance + appearance distance =

$d(X_n, X_{n-1}) + d(p_n, p_{n-1}) + d(c_n, c_{n-1}) =$ $\sqrt{(x_{151}-x_{111})^2+(y_{151}-y_{111})^2} + \sqrt{(p_{151}-p_{111})^2} + \sqrt{(c_{151}-c_{111})^2}$ where X denotes coordinates of the object proposal region, p denotes object detection probability of the object proposal region and c denotes appearance measure of the object proposal region.

In one further example the distance measure $d_{111\_151}$, is weighted and calculated as $$d_{111_{151}} = n_1 * \text{spatial distance} +$$
$$n_2 * \text{detection probability distance} + n_3 * \text{appearance distance} =$$
$$n_1 * d(X_n, X_{n-1}) + n_2 * d(p_n, p_{n-1}) + n_3 * d(c_n, c_{n-1}) =$$
$$n_1 * \sqrt{(x_{151} - x_{111})^2 + n_2 * (y_{151} - y_{111})} +$$
$$n_3 * \sqrt{(p_{151} - p_{111})^2} + \sqrt{(c_{151} - c_{111})^2}$$

In one embodiment, the object proposal region is formed as a rectangle having a two dimensional center coordinate (x, y), a width w and a height h, wherein the spatial-probability distance measure is calculated based on vectors formed by:
X=[x, y, w, h, p], wherein p detection probability of the object proposal region.

FIG. 5A illustrates distance measures $D_{n,n-1}$ according to one or more embodiments. With reference to FIG. 4, the distance measures may be stored or arranged in a matrix data structure. As can be seen in the figure, the distance measures related to object proposal region 111 is arranged in the first column, object proposal region 121 is arranged in the second column, and so forth.

FIG. 5B illustrates mapping of object proposal regions according to one or more embodiments. As can be seen from the figure, object proposal region 121 of the previous frame ($F_{n-1}$) is mapped to proposal region 161 of the current frame ($F_n$) based on the fact that $d_{121\_161}$ comprises a minimum distance of the distance measures in the second column. In other words, it is determined that the object 120 comprised in object proposal region 121 represent the same object as object 160 comprised in object proposal region 161.

Figure 6:
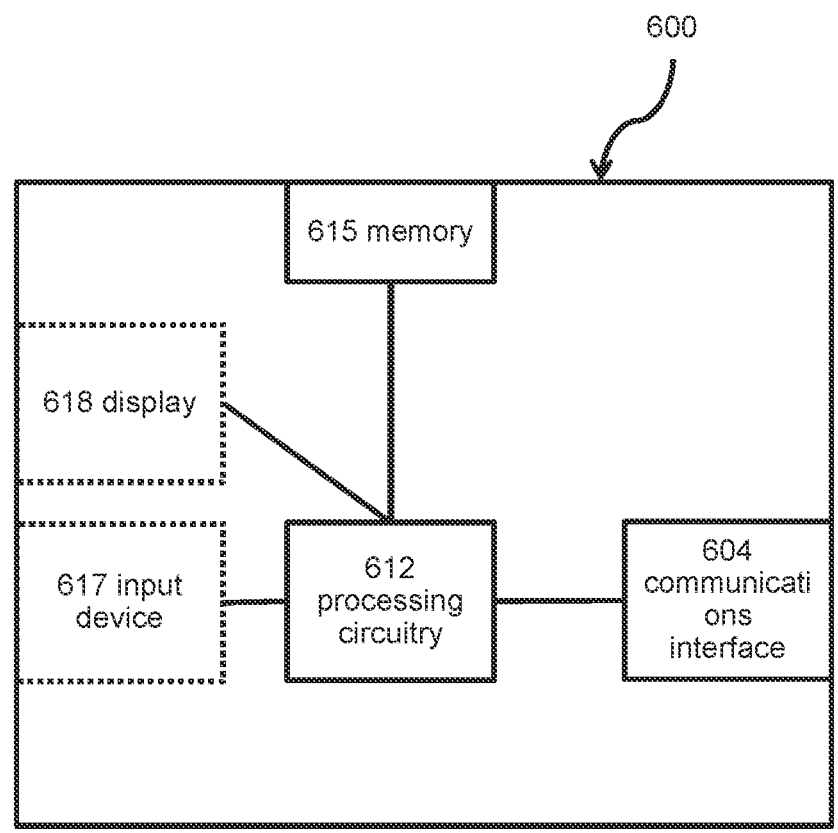
FIG. 6 shows details of a computer according to one or more embodiments.

FIG. 6 shows details of a computer 600 according to one or more embodiments. The computer 600 may be in the form of a selection of any of image processing equipment, one or more servers, one or more cloud or virtual servers. The computer 600 may comprise processing circuitry 612 optionally communicatively coupled to a communications interface 604 for wired and/or wireless communication. Further, the computer 600 may further comprise at least one optional antenna (not shown in figure). The antenna may be coupled to a transceiver of the communications interface 604 and is configured to transmit and/or emit and/or receive a wireless signals in a wireless communication system. In one example, the processing circuitry 612 may be any of a selection of processor and/or a central processing unit and/or processor modules and/or multiple processors configured to cooperate with each-other. Further, the computer 600 may further comprise a memory 615. The memory 615 may contain instructions executable by the processing circuitry to perform any of the methods and/or method steps described herein.

The communications interface 604, e.g. the wireless transceiver and/or a wired/wireless communications network adapter, which is configured to send and/or receive data values or parameters as a signal to or from the processing circuitry 612 to or from other external nodes, e.g. a video streaming server (not shown in the figure). In an embodiment, the communications interface communicates directly between nodes or via a communications network.

In one or more embodiments the computer 600 may further comprise an input device 617, configured to receive input or indications from a user and send a user-input signal indicative of the user input or indications to the processing circuitry 612.

In one or more embodiments the computer 600 may further comprise a display 618 configured to receive a display signal indicative of rendered objects, such as text or graphical user input objects, from the processing circuitry 612 and to display the received signal as objects, such as text or graphical user input objects.

In one embodiment the display 618 is integrated with the user input device 617 and is configured to receive a display signal indicative of rendered objects, such as text or graphical user input objects, from the processing circuitry 612 and to display the received signal as objects, such as text or graphical user input objects, and/or configured to receive input or indications from a user and send a user-input signal indicative of the user input or indications to the processing circuitry 612.

In embodiments, the processing circuitry 612 is communicatively coupled to the memory 615 and/or the communications interface 604 and/or the input device 617 and/or the display 618 and/or one or more sensors (not shown in the figure).

In embodiments, the communications interface and/or transceiver 604 communicates using wired and/or wireless communication techniques. In embodiments, the one or more memory 615 may comprise a selection of a hard RAM, disk drive, a floppy disk drive, a magnetic tape drive, an optical disk drive, a CD or DVD drive (R or RW), or other removable or fixed media drive.

In a further embodiment, the computer 600 may further comprise and/or be coupled to one or more additional sensors (not shown) configured to receive and/or obtain and/or measure physical properties pertaining to the computer or the environment of the computer, and send one or more sensor signals indicative of the physical properties to the processing circuitry 612.

It is to be understood that a computer comprises any suitable combination of hardware and/or software needed to perform the tasks, features, functions and methods disclosed herein. Moreover, while the components of the computer are depicted as single boxes located within a larger box, or nested within multiple boxes, in practice, a computer may comprise multiple different physical components that make up a single illustrated component (e.g., memory 615 may comprise multiple separate hard drives as well as multiple RAM modules).

Similarly, computer 60 may be composed of multiple physically separate components, which may each have their own respective components.

The communications interface 604 may also include multiple sets of various illustrated components for different wireless technologies, such as, for example, GSM, WCDMA, LTE, NR, WiFi, or Bluetooth wireless technologies. These wireless technologies may be integrated into the same or different chip or set of chips and other components within the computer 600.

Processing circuitry 612 is configured to perform any determining, calculating, or similar operations (e.g., certain obtaining operations) described herein as being provided by a computer 600. These operations performed by processing circuitry 612 may include processing information obtained by processing circuitry 612 by, for example, converting the obtained information into other information, comparing the obtained information or converted information to information stored in the network node, and/or performing one or more operations based on the obtained information or converted information, and as a result of said processing making a determination.

Processing circuitry 612 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other computer 600 components, such as device readable medium, computer 600 functionality. For example, processing circuitry 612 may execute instructions stored in device readable medium 615 or in memory within processing circuitry 612. Such functionality may include providing any of the various wireless features, functions, or benefits discussed herein. In some embodiments, processing circuitry 612 may include a system on a chip (SOC).

In some embodiments, processing circuitry 612 may include one or more of radio frequency (RF) transceiver circuitry and baseband processing circuitry. In some embodiments, radio frequency (RF) transceiver circuitry and baseband processing circuitry may be on separate chips (or sets of chips), boards, or units, such as radio units and digital units. In alternative embodiments, part or all of RF transceiver circuitry and baseband processing circuitry may be on the same chip or set of chips, boards, or units In certain embodiments, some or all of the functionality described herein as being provided by a computer 600 may be performed by processing circuitry 612 executing instructions stored on device readable medium 615 or memory within processing circuitry 612. In alternative embodiments, some or all of the functionality may be provided by processing circuitry 612 without executing instructions stored on a separate or discrete device readable medium, such as in a hard-wired manner. In any of those embodiments, whether executing instructions stored on a device readable storage medium or not, processing circuitry 612 can be configured to perform the described functionality. The benefits provided by such functionality are not limited to processing circuitry 612 alone or to other components of computer 600, but are enjoyed by computer 600 as a whole, and/or by end users.

Device readable medium 615 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 612. Device readable medium 615 may store any suitable instructions, data or information, including a computer program, software, an application including one or more of logic, rules, code, tables, etc. and/or other instructions capable of being executed by processing circuitry 612 and, utilized by computer 600. Device readable medium QQ180 may be used to store any calculations made by processing circuitry 612 and/or any data received via interface 604. In some embodiments, processing circuitry 612 and device readable medium 615 may be considered to be integrated.

Interface 604 is used in the wired or wireless communication of signaling and/or data between computer 600 and other nodes. Interface 604 may comprise port(s)/terminal(s) to send and receive data, for example to and from computer 600 over a wired connection. Interface 604 also includes radio front end circuitry that may be coupled to, or in certain embodiments a part of, an antenna. Radio front end circuitry may comprise filters and amplifiers. Radio front end circuitry may be connected to the antenna and/or processing circuitry 612.

Examples of a computer 600 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

The communication interface may 604 encompass wired and/or wireless networks such as a local-area network (LAN), a wide-area network (WAN), a computer network, a wireless network, a telecommunications network, another like network or any combination thereof. The communication interface may be configured to include a receiver and a transmitter interface used to communicate with one or more other devices over a communication network according to one or more communication protocols, such as Ethernet, TCP/IP, SONET, ATM, optical, electrical, and the like). The transmitter and receiver interface may share circuit components, software or firmware, or alternatively may be implemented separately.

In one embodiment, a computer is provided and is configured to perform any of the method steps described herein.

In one embodiment, a computer program is provided and comprises computer-executable instructions for causing a computer, when the computer-executable instructions are executed on a processing unit comprised in the computer, to perform any of the method steps described herein.

In one embodiment, a computer program product is provided and comprises a computer-readable storage medium, the computer-readable storage medium having the computer program above embodied therein.

In one embodiment, a carrier is provided and contains the computer program above. The carrier may be any one of an electronic signal, an optical signal, a radio signal, or a computer readable storage medium.

Finally, it should be understood that the invention is not limited to the embodiments described above, but also relates to and incorporates all embodiments within the scope of the appended independent claims.

The invention claimed is:

1. A computer implemented method for associating proposal regions representing objects in a video comprising subsequent frames, the method comprising:
   obtaining first object proposal region information of a previous frame,
   determining second object proposal region information of a current frame, wherein the first and second object proposal region information are at least indicative of an appearance measure, a spatial location and a detection probability of each object proposal region of the respective frame,
   associating objects in the video by at least associating a first set of object proposal regions of the previous frame to a second set of object proposal regions of the current frame, wherein the object proposal regions are associated using distance measures calculated based on the appearance measures, the spatial locations and the detection probabilities.

2. The method according to claim 1, wherein associating objects in the video further comprises:
mapping a first set of object proposal regions of the previous frame to a second set of object proposal regions of the current frame based on minimum distances of the distance measures,
adapting the detection probability of each mapped object proposal region of the current frame,
detecting objects of the current frame by determining mapped object proposal regions of the current frame having a detection probability above a threshold.

3. The method according to claim 2, wherein the distance measures between object proposal regions of the previous frame and the object proposal regions of the current frame are calculated as: $D_{n,n-1}=d(X_n,X_{n-1})+d(c_n,c_{n-1})$, wherein $d(X_n,X_{n-1})$ is a combined spatial-probability distance measure and $d(c_n,c_{n-1})$ is an appearance distance measure.

4. The method according to claim 3, wherein the distance measures are calculated as a weighted sum of the combined spatial-probability distance measure and the appearance distance measure.

5. The method according to claim 3, wherein the object proposal region is formed as a rectangle having a two dimensional center coordinate x,y, a width w and a height h, wherein the spatial-probability distance measure is calculated based on vectors formed by:
X=[x, y, w, h, p], wherein p detection probability of the object proposal region.

6. The method according to claim 3, wherein the detection probability of each mapped object proposal region of the current frame is adapted if the corresponding appearance distance measure is below a second threshold.

7. A computer configured to perform the method according to claim 1.

8. A computer program product comprising a non-transitory computer readable medium storing computer-executable instructions for causing a computer, when the computer-executable instructions are executed on a processing unit comprised in the computer, to perform any of the method steps according to claim 1.

9. The method according to claim 2, wherein the combined spatial-probability distance measure is based on combining a respective spatial measures and the detection probabilities.

* * * * *